(12) United States Patent
Terry

(10) Patent No.: US 8,295,839 B2
(45) Date of Patent: Oct. 23, 2012

(54) WIRELESS COMMUNICATION METHOD AND APPARATUS FOR RECOVERING DATA FOLLOWING A SERVING CELL CHANGE BASED ON A RADIO LINK CONTROL INTELLIGENCE MODE IN EFFECT

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1227 days.

(21) Appl. No.: 11/837,176

(22) Filed: Aug. 10, 2007

(65) Prior Publication Data
US 2008/0045219 A1 Feb. 21, 2008

Related U.S. Application Data

(60) Provisional application No. 60/838,790, filed on Aug. 17, 2006.

(51) Int. Cl.
| H04W 36/00 | (2009.01) |
| H04W 4/00 | (2009.01) |
| H04B 7/216 | (2006.01) |
| H04J 3/06 | (2006.01) |
| H04J 3/16 | (2006.01) |
| H04J 3/00 | (2006.01) |
| H04L 12/56 | (2006.01) |
| H04L 12/413 | (2006.01) |
| H04L 1/00 | (2006.01) |

(52) U.S. Cl. ........ 455/436; 370/473; 370/331; 370/350; 370/468; 370/449; 370/342; 370/236; 370/394

(58) Field of Classification Search ................. 455/436; 370/473, 331, 350, 449, 468, 236, 458, 342, 370/394
See application file for complete search history.

(56) References Cited

U.S. PATENT DOCUMENTS
| 2002/0191544 A1* | 12/2002 | Cheng et al. .................. 370/236 |
| 2004/0208160 A1* | 10/2004 | Petrovic et al. ............... 370/350 |
| 2006/0013257 A1* | 1/2006 | Vayanos ....................... 370/473 |
| 2007/0008990 A1* | 1/2007 | Torsner ......................... 370/473 |
| 2007/0168827 A1* | 7/2007 | Lohr et al. .................... 714/749 |

OTHER PUBLICATIONS

3GPP, "3rd Generation Partnership Project; Technical Specification Group Radio Access Network; Radio Link Control (RLC) Protocol Specification (Release 6)", 3GPP TS 25.322 V6.8.0 (Jun. 2006).

(Continued)

Primary Examiner — Christopher M Brandt
Assistant Examiner — Muthuswamy Manoharan
(74) Attorney, Agent, or Firm — Volpe and Koenig, P.C.

(57) ABSTRACT

A wireless communication method and apparatus for recovering data following a serving cell change are disclosed. A wireless transmit/receive unit (WTRU) includes a status prohibit timer that delays the transmission of normal status reports that indicate the status of data, (i.e., PDUs), that was successfully received and/or not successfully received after a serving cell change status report is sent. A serving radio network controller (SRNC) transmits a sequence of packet data units (PDUs). The status prohibit timer is advanced and the WTRU sends a normal status report to the SRNC without a delay caused by the status prohibit timer. In another embodiment, the WTRU receives a radio link control (RLC) intelligence mode indicator signal that indicates whether a non-intelligent radio network controller (RNC) RLC operation or an intelligent RNC RLC operation is in effect, and the WTRU generates normal status reports based on the indication of the signal.

4 Claims, 6 Drawing Sheets

OTHER PUBLICATIONS

3GPP, "3rd Generation Partnership Project; Technical Specification Group Radio Access Network; Radio Link Control (RLC) Protocol Specification (Release 6)", 3GPP TS 25.322 V6.10.0 (Jun. 2007).

3GPP, "3rd Generation Partnership Project; Technical Specification Group Radio Access Network; Radio Link Control (RLC) Protocol Specification (Release 5)", 3GPP TS 25.322 V5.13.0 (Dec. 2005).

* cited by examiner

WIRELESS COMMUNICATION METHOD AND APPARATUS FOR RECOVERING DATA FOLLOWING A SERVING CELL CHANGE BASED ON A RADIO LINK CONTROL INTELLIGENCE MODE IN EFFECT

CROSS REFERENCE TO RELATED APPLICATIONS

This application claims the benefit of U.S. Provisional Application No. 60/838,790 filed Aug. 17, 2006, which is incorporated by reference as if fully set forth.

FIELD OF INVENTION

The present invention is related to a wireless communication system including a wireless transmit/receive unit (WTRU) and a serving radio network controller (SRNC). More particularly, the present invention is related to radio link control (RLC) and a serving high speed-downlink shared channel (HS-DSCH) cell change procedure during which the WTRU sends serving cell change status reports to the SRNC.

BACKGROUND

In Third Generation Partnership Project (3GPP) standards Release 5 and 6, a WTRU generates an RLC layer status report upon a serving HS-DSCH cell change in order to recover data buffered in a source Node-B at the moment of handover.

For inter Node-B, and some intra Node-B, serving HS-DSCH cell changes, the SRNC signals a medium access control-high speed (MAC-hs) layer reset to the WTRU, which resets any hybrid automatic repeat request (HARQ) processes upon reception, and forwards data in downlink (DL) reordering queues to the RLC layer. Once this data has been processed, a serving cell change status report is transmitted from the WTRU to the SRNC. The process described above will generally be referred to herein as a "serving cell change" procedure.

In an intelligent RLC operation, the SRNC receives the serving cell change status report and determines which packet data unit (PDU) buffered at the source Node-B should be retransmitted. This intelligent implementation requires the SRNC RLC entity to distinguish between old status reports that are potentially delayed in uplink (UL) reordering queues, and the status reports that are sent as a result of the serving cell change procedure. The intelligent RLC operation further requires that the SRNC RLC retransmits all outstanding transmitted PDUs, not just the PDUs that have been explicitly negatively acknowledged (NACKed) in the serving cell change status report. If the SRNC does not provide intelligent implementation logic, recovery of the source Node-B's buffered data may be further delayed.

In a non-intelligent RLC operation, retransmissions only result when PDUs are marked as unsuccessfully received (NACKed) in serving cell change status reports. Such serving cell change status reports identify successfully and unsuccessfully received (i.e., missing) PDUs up to the last correctly received PDU sequence number. When a serving cell change status report is received as a result of a serving HS-DSCH cell change, smart implementations will retransmit all previously transmitted data which is not indicated as having been successfully received.

FIG. 1 is a block diagram of a conventional wireless communication system 100 including an SRNC 105 and a WTRU 110. The WTRU 100 includes a processor 115, a transmitter 120, a receiver 125, a status prohibit timer 130 and an antenna 135. The SRNC 105 includes an antenna 140, a transmitter 145, a receiver 150 and a processor 155. The SRNC 105 controls handover between a source Node-B 142 and a target Node-B 144.

FIG. 2A shows an example of a serving cell change procedure implemented by the conventional wireless communication system 100 of FIG. 1, whereby five RLC PDUs are transmitted by the SRNC 105 and only one of the transmitted PDUs is successfully received by the WTRU 110. As shown in FIG. 2A, if PDUs 1, 2, 3, 4 and 5 are transmitted by the SRNC 105 via its antenna 140, and the WTRU 110 only successfully receives PDU 3 in advance of a serving cell change via its antenna 135, the WTRU 110 sends a serving cell change status report 155A to the SRNC 105 via the antenna 135 and the status prohibit timer 130 is activated. As referred to hereafter, the terminology "normal status report" refers to a status report that indicates the status of data, (i.e., PDUs), that was successfully received and/or not successfully received after a serving cell change status report is sent.

FIGS. 2B and 2C shows how a non-intelligent radio network controller (RNC) RLC operation may be implemented by the conventional wireless communication system 100 of FIG. 1 for the example of FIG. 2A.

As shown in FIG. 2B, only PDUs 1 and 2 are retransmitted by the SRNC 105 via the antenna 140 as a result of the SRNC 105 receiving the serving cell change status report 155A via the antenna 140. Then, the SRNC 105 resumes with the regular transmission, starting with PDU 6. However, after PDUs 1 and 2 are retransmitted by the SRNC 105, and the PDU 6 is transmitted by the SRNC 105 and received by the WTRU 110, a normal status report 155B is sent by the WTRU 110 that explicitly signals the unsuccessful delivery of PDUs 4 and 5, (as well as the successful delivery of PDU 6). However, this does not occur until after the status prohibit timer 130 expires, thus causing a delay in recovering the PDUs 4 and 5.

FIG. 2C shows the SRNC 105 retransmitting PDUs 4 and 5 after the SRNC 105 receives the normal status report 155B from the WTRU 110 during the non-intelligent radio network controller (RNC) RLC operation.

FIG. 2D shows how an intelligent RNC RLC operation may be implemented by the conventional wireless communication system 100 of FIG. 1 for the example of FIG. 2A. As shown in FIG. 2D, the SRNC 105 retransmits, via the antenna 140, all of the PDUs that the serving cell change status report 155A of FIG. 2A did not indicate as having been successfully received. Accordingly, PDUs 1, 2, 4 and 5 are retransmitted in the target Node-B 144. Thus, data lost in the source Node-B 142 is fully recovered.

The status prohibit timer 130 in the WTRU 110 is configured by radio resource control (RRC) signaling. Unfortunately, the status prohibit timer 130 is often configured to reduce the frequency of repetitive normal status reports, which further delays the normal status report triggered by the reception of PDU 6 and the retransmissions of PDUs 4 and 5.

One solution to avoid the additional delay in sending normal status reports caused by the status prohibit timer 130 in the WTRU 110, is for the WTRU 110 to wait for the first PDU to be received, (which increases the receive sequence), before generating a normal status report. However, this solution results in eliminating the fast recovery of source Node-B buffered data offered by the intelligent RNC RLC operation.

Additionally, it could be argued further that just removing the normal status report criteria would provide a similar result as the proposed solution for the case described. If PDU 6 is received out-of-sequence, the normal status report will be generated. Otherwise, there is no data to recover and, in this case, the unnecessary generation of a normal status report is avoided.

The case where the last PDU is transmitted in the source Node-B 142 also needs to be considered. For example, take the case described above where PDU 5 is the last PDU to be transmitted. In this case, without PDU 6 causing out-of-sequence triggering of the normal status report, the intelligent RLC implementation is the only way to achieve fast recovery.

A solution that allows for the intelligent RNC RLC operation benefits, without negatively effecting non-intelligent RNC RLC operations, is needed. The generation of a status report upon a serving cell change should be maintained for fast data recovery by intelligent RNC RLC operations, while recovery by non-intelligent RNC RLC operations should not be further delayed.

SUMMARY

The present invention is related to a wireless communication method and apparatus for recovering data following a serving cell change. A WTRU unit includes a status prohibit timer that delays the transmission of normal status reports that indicate the status of data, (i.e., PDUs), that was successfully received and/or not successfully received after a serving cell change status report is sent. An SRNC transmits a sequence of PDUs. The status prohibit timer is advanced and the WTRU sends a normal status report to the SRNC without a delay caused by the status prohibit timer.

In another embodiment, the WTRU receives a radio link control (RLC) intelligence mode indicator signal that indicates whether a non-intelligent radio network controller (RNC) RLC operation or an intelligent RNC RLC operation is in effect, and the WTRU generates normal status reports based on the indication of the signal.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an eNodeB, a site controller, an access point (AP), or any other type of interfacing device capable of operating in a wireless environment.

Figure 1:
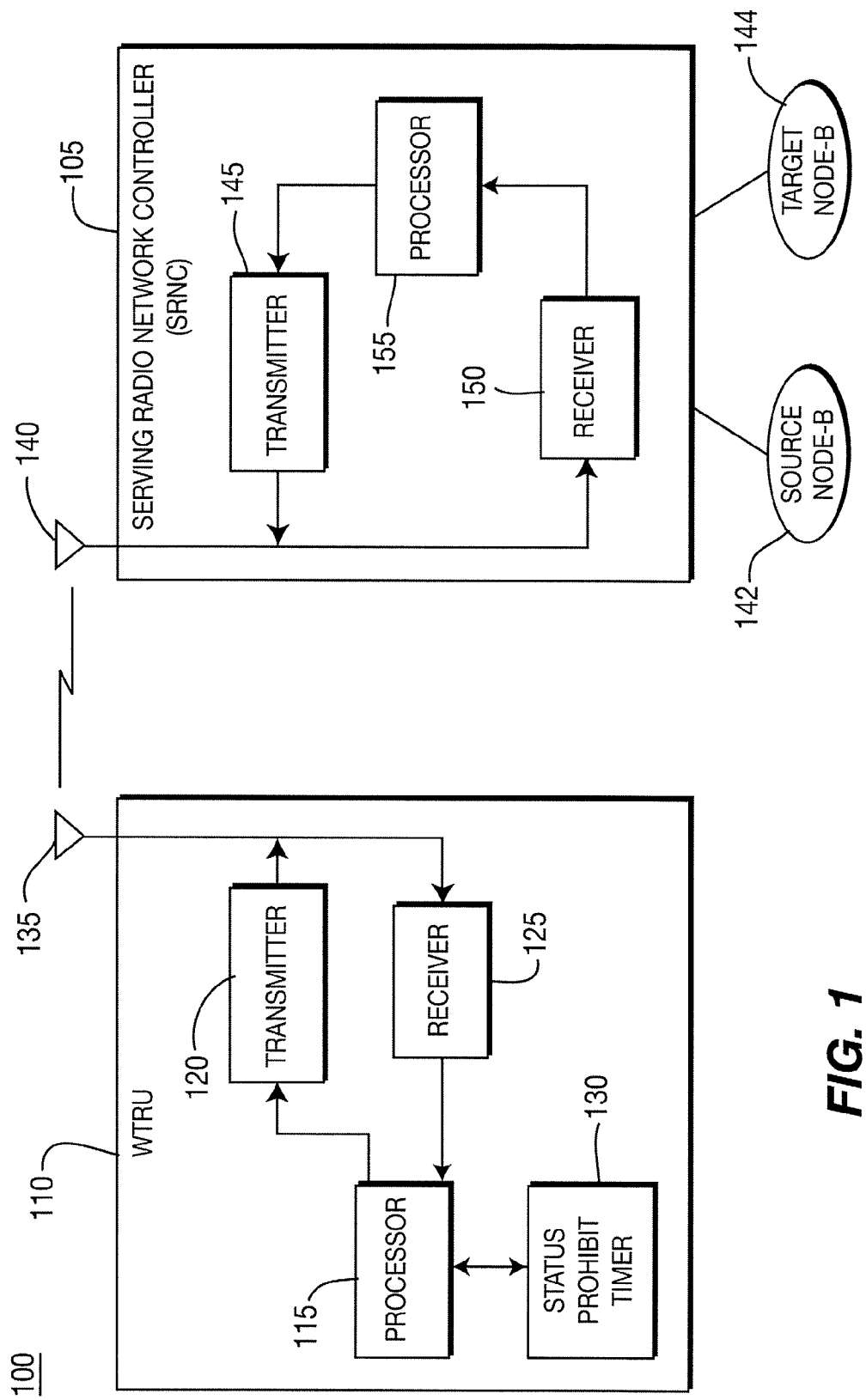
FIG. 1 is a block diagram of a conventional wireless communication system including an SRNC and a WTRU.
Figure 2A:
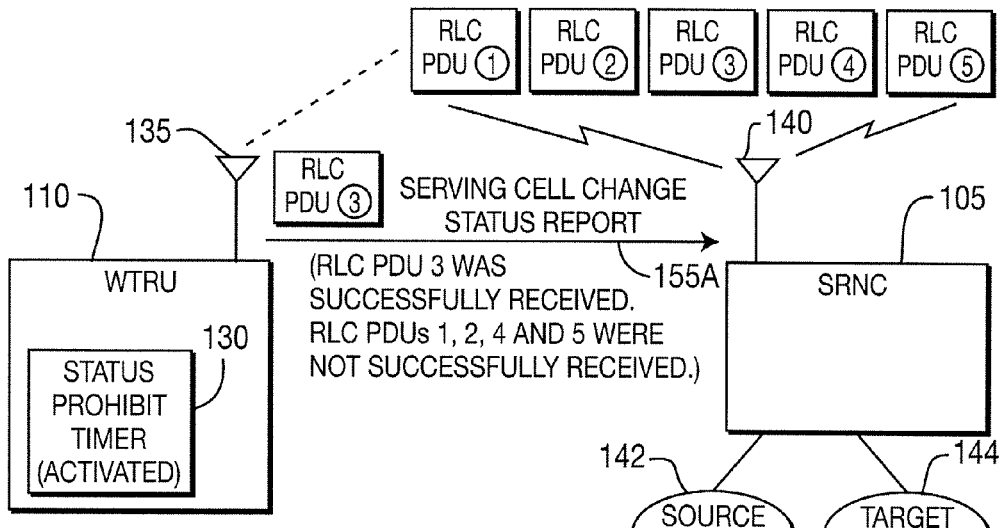
FIG. 2A shows an example of a serving cell change procedure implemented by the conventional wireless communication system of FIG. 1, whereby 5 RLC PDUs are transmitted by the SRNC and only one of the transmitted PDUs is successfully received by the WTRU.
Figure 2B:
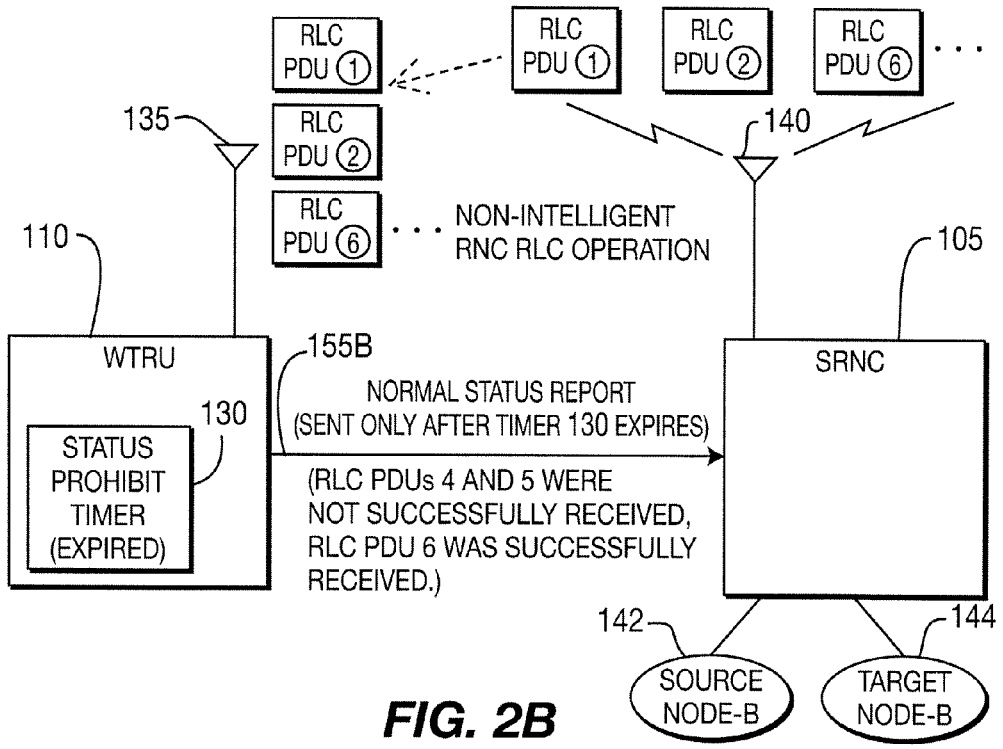
FIGS. 2B and 2C shows how a non-intelligent RNC RLC operation may be implemented by the conventional wireless communication system of FIG. 1 for the example of FIG. 2A.
Figure 2C:
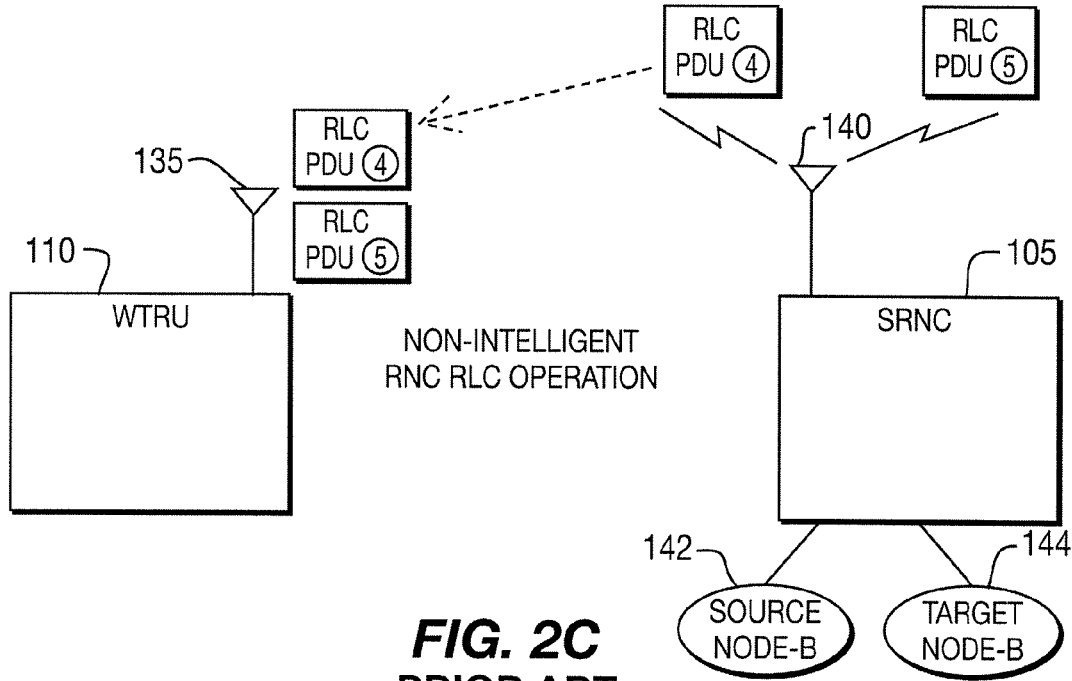
Figure 2D:
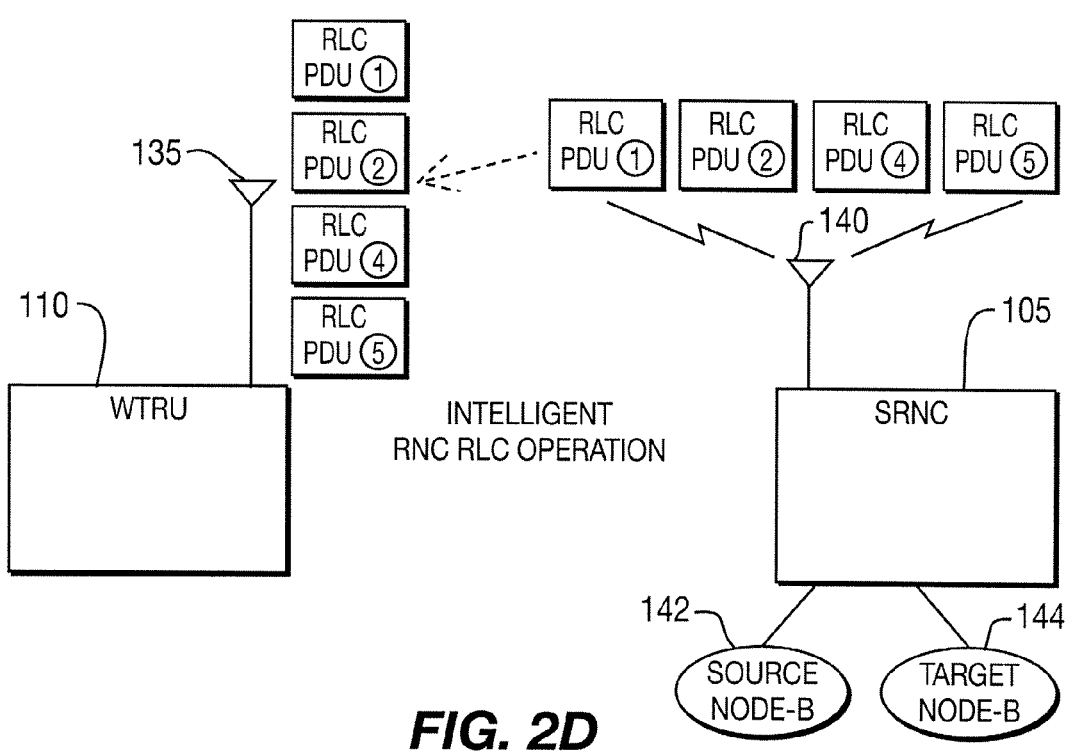
FIG. 2D shows how an intelligent RNC RLC operation may be implemented by the conventional wireless communication system of FIG. 1 for the example of FIG. 2A.
Figure 3:
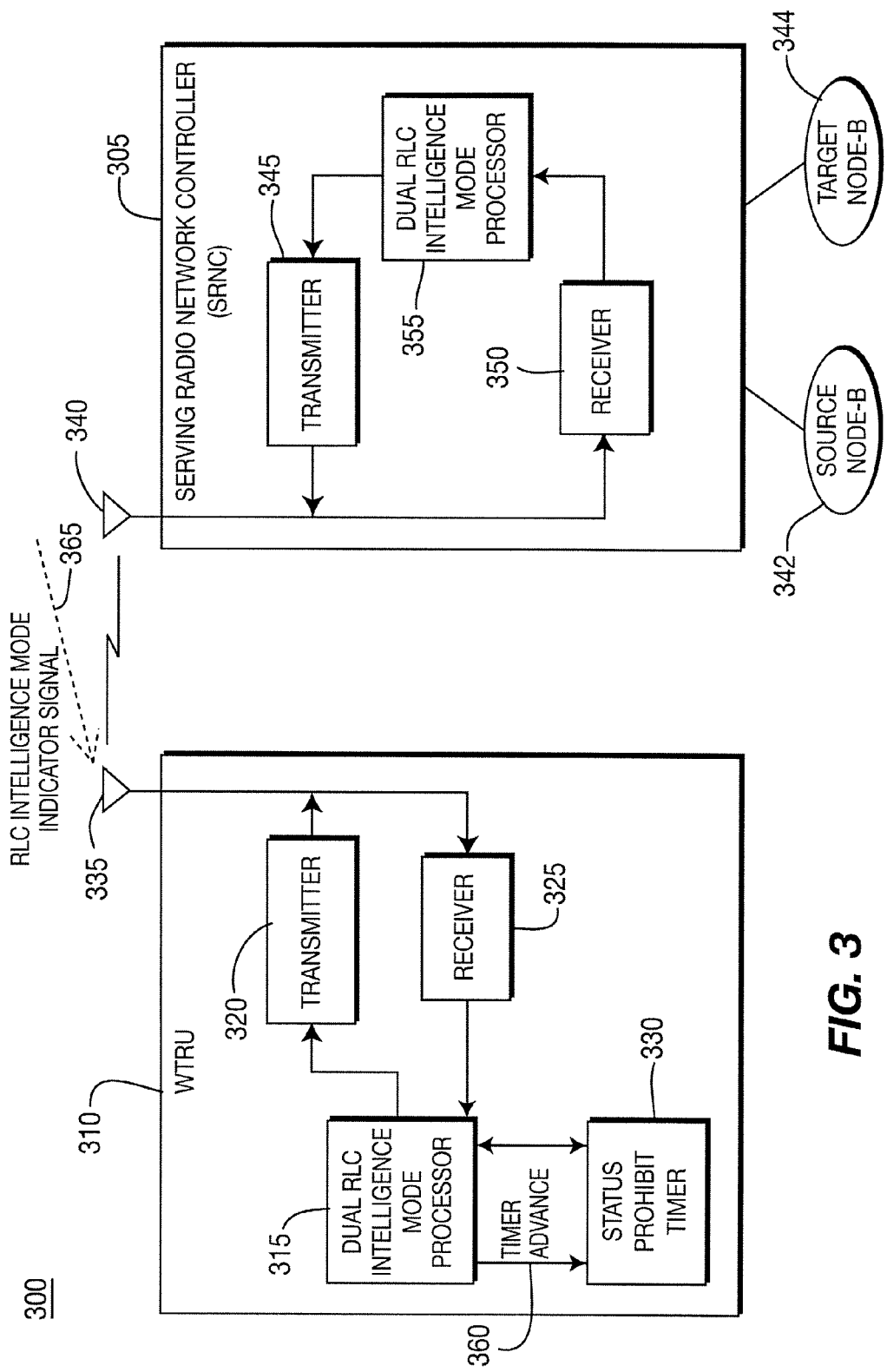
FIG. 3 is a block diagram of a wireless communication system configured in accordance with the present invention.

FIG. 3 is a block diagram of a wireless communication system 300 configured in accordance with the present invention. The system 300 includes an SRNC 305 and a WTRU 310. The WTRU 310 includes a dual RLC intelligence mode processor 315, a transmitter 320, a receiver 325, a status prohibit timer 330 and an antenna 335. The SRNC 305 includes an antenna 340, a transmitter 345, a receiver 350 and a dual RLC intelligence mode processor 355. The SRNC 105 controls handover between a source Node-B 342 and a target Node-B 344.

To maintain fast normal status report generation and not further delay data recovery by non-intelligent implementations, it is proposed that when the existing serving cell change status report is generated, the status prohibit timer 330 is advanced by the dual RLC intelligence mode processor 315 by sending a timer advance signal 360 to the status prohibit timer 330 so that the timer status is expired upon the reception of the first PDU in the target cell. With forced expiration of the status prohibit timer 330, generation and transmission of normal status reports based on normal triggering criteria is not delayed.

In one embodiment, the timer 330 is activated upon the occurrence of a serving cell change until the reception of the first DL PDU, and potentially to further limit normal status reports to only those cases where the PDU increases the receive sequence. For example, if PDU 3 is received and PDUs 1 and 2 are missing, a serving cell change status report is generated that indicates that PDUs 1 and 2 are missing. However, in accordance with the present invention, the generation of normal status reports may be optional and are only transmitted if a successfully received PDU increases the received RLC sequence number, (i.e., the PDU is a newly transmitted PDU, not a retransmitted PDU).

In a preferred embodiment of the present invention, a serving cell change status report is not sent upon the first downlink PDU reception, and existing status report triggering mechanisms are used to reduce unnecessary reporting. Thus, a normal status report is only triggered upon the reception of PDU 6, since there was a sequence number gap for missing PDUs 4 and 5. If the next PDU transmitted was a previously missing PDU, (e.g., PDU 4 is retransmitted), then a normal status report would not be generated. This change allows for fast data recovery in the target cell by generating the serving cell change status report without delay, and allowing a subsequent non-delayed normal status report for out-of-sequence reception, (if it occurs), so that non-intelligent implementations are not further delayed.

The only negative effect is that an extra status PDU is generated in the case where the PDU 6 is transmitted immediately in the target cell. However, in the non-intelligent implementation case, the normal status report provides fast recovery of PDUs with lower sequence numbers then the last received PDU.

Referring to FIG. 3, in accordance with one embodiment of the present invention, the generation of normal status report is eliminated by sending an RLC intelligence mode indicator signal 365 to the WTRU 310 that indicates whether an intelligent RLC mode or a non-intelligent RLC mode is in effect in the system 300. The RLC intelligence mode indicator signal 365 may be sent by a universal terrestrial radio access network (UTRAN) RLC (not shown). The RLC intelligence mode indicator signal 365 may be explicitly or implicitly signaled by a radio resource control (RRC) RLC configuration during radio bearer establishment or in the serving cell change procedure. Thus, upon normal radio bearer establishment, the RRC procedure would indicate a new parameter to indicate whether the system 100 is implementing a non-intelligent RLC operation or an intelligent RLC operation. If the dual RLC intelligence mode processor 315 in the WTRU 310 knows that an intelligent RLC operation is in effect, the transmitter 320 in the WTRU 320 may send only one serving cell change status report and not take any other action. If the dual RLC intelligence mode processor 315 in the WTRU 310 knows that a non-intelligent RLC operation is in effect, the transmitter 320 in the WTRU 320 will not send a serving cell change status report until a first PDU is received.

If an intelligent RLC operation is implemented in the dual RLC intelligence mode processor 355 in the SRNC 305, the dual RLC intelligence mode processor 315 in the WTRU 310 would choose to immediately generate a serving cell change status report and there would be no need to send a timer advance signal 360 to the status prohibit timer 330. Other than the additional status report, there would be no further negative effect. If a non-intelligent RLC operation is implemented in the dual RLC intelligence mode processor 355 in the SRNC 305, the dual RLC intelligence mode processor 315 in the WTRU 310 will would wait for the first RLC PDU with increased receive sequence to generate the serving cell change status report.

Another alternative for the serving cell change would be to just advance the status prohibit timer 330 without automatic status report generation. The first received RLC PDU would trigger a status report that would indicate whether there are any missing PDUs. This solution would allow for the first received RLC PDU to trigger a non-delayed serving cell change status report only when needed.

Unfortunately, the fast recovery offered by the intelligent RLC operation would be lost due to waiting for the first transmission in the new cell. Furthermore, a significant additional delay would occur if the last RLC PDU was transmitted (unsuccessfully) in the source cell. However, this solution avoids the generation of unnecessary status reports as compared to just delaying the transmission of a serving cell change status report until after the first RLC PDU is received.

Figure 4:
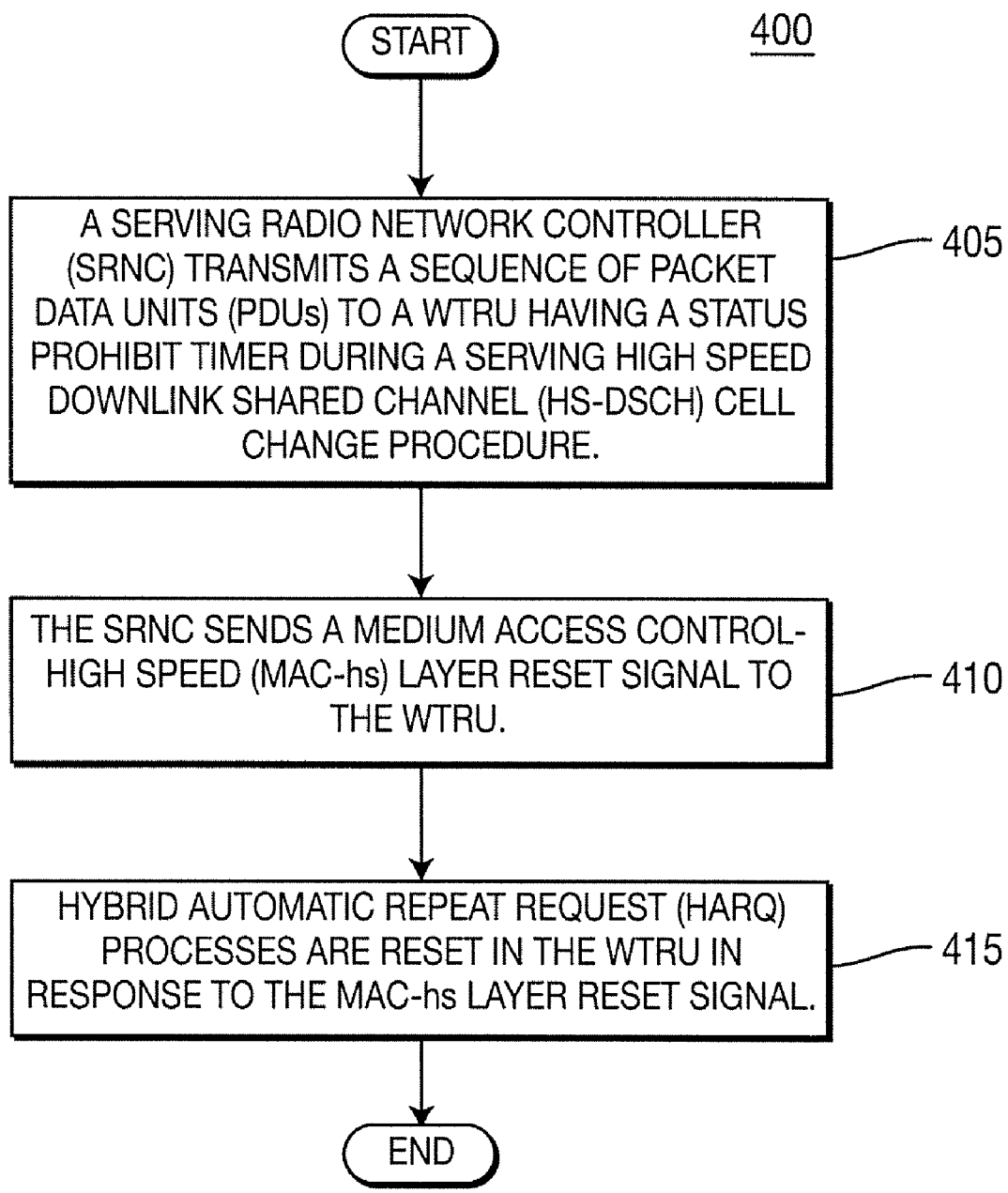
FIGS. 4 and 5 are flow diagrams of serving HS-DSCH cell change procedures that is implemented by the wireless communication system of FIG. 3.

FIG. 4 is a flow diagram of a serving HS-DSCH cell change procedure 400 that is implemented by the wireless communication system 300 of FIG. 3. Referring to FIGS. 3 and 4, the transmitter 345 in the SRNC 305 transmits a sequence of PDUs to the WTRU 310 during a serving HS-DSCH cell change procedure (step 405). In step 410, the transmitter 345 in the SRNC 305 sends a MAC-hs layer reset signal to the WTRU 310. In step 415, HARQ processes are reset in the WTRU 310 in response to the receiver 325 receiving the MAC-hs layer reset signal.

Figure 5:
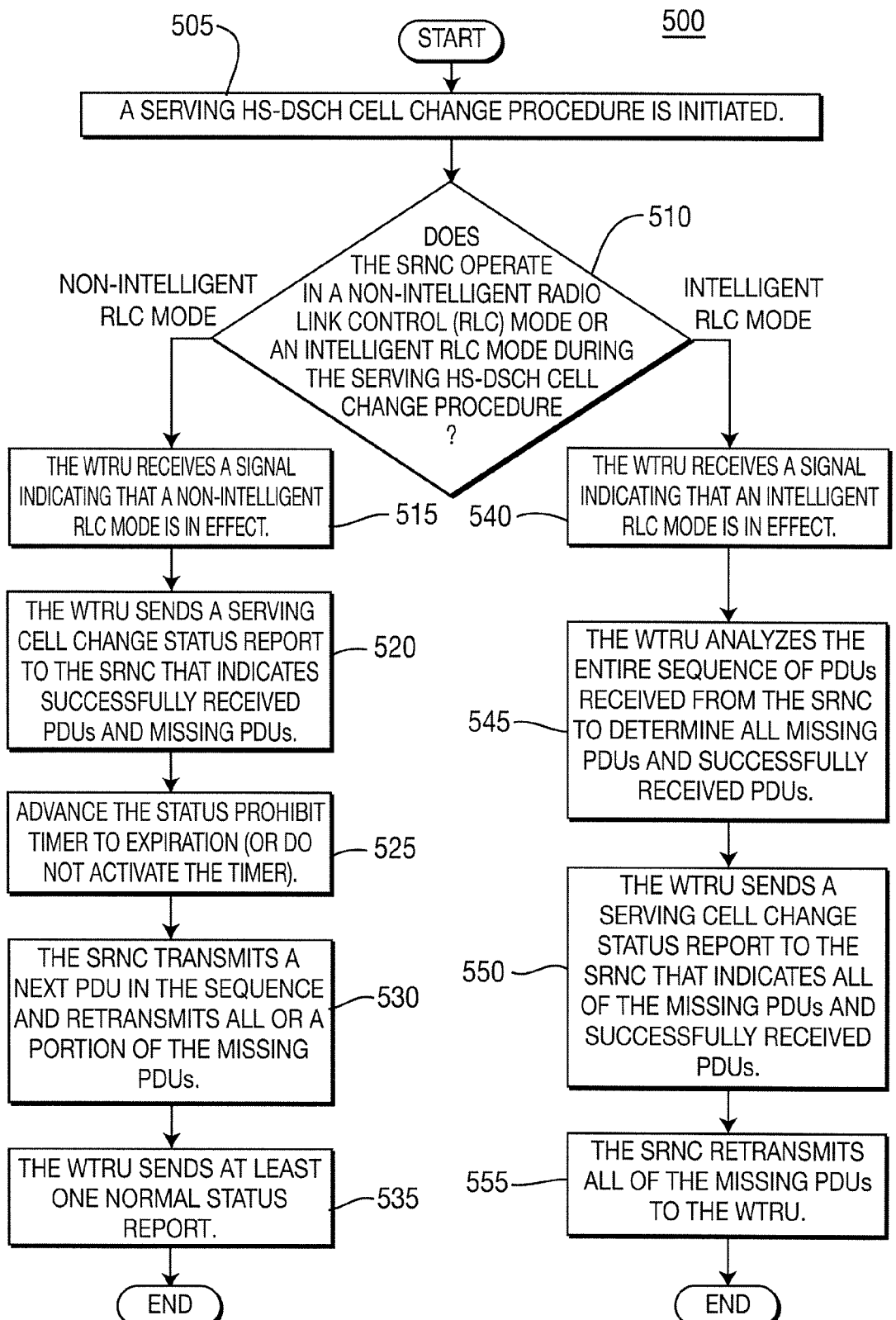

FIG. 5 is a flow diagram of a serving HS-DSCH cell change procedure 500 that is also implemented by the wireless communication system 300 of FIG. 3. Referring to FIGS. 3 and 5, a serving HS-DSCH cell change procedure is initiated in step 505. In steps 510, 515 and 540, the dual RLC intelligence mode processor 315 in the WTRU 310 determines whether the SRNC 305 is operating in a non-intelligent RLC mode or an intelligent RLC mode based on a received RLC intelligence mode indicator signal 365 received by the receiver 325 in the WTRU 310. The indicator signal 365 may be a handover command.

If the receiver 325 in the WTRU 310 receives an RLC intelligence mode indicator signal 365 that indicates that a non-intelligent RLC mode is in effect (step 515), the transmitter 320 in the WTRU 310 sends a serving cell change status report to the SRNC 305 that indicates successfully received PDUs and missing PDUs (step 520). In step 525, the dual RLC intelligence mode processor 315 either sends a timer advance signal 360 to advance the status prohibit timer 330 to expiration, or the status prohibit timer 330 is not activated. In step 530, the transmitter 345 in the SRNC 305 transmits a next PDU in the sequence of PDUs and retransmits all or a portion of the missing PDUs. In step 535, the transmitter 320 in the WTRU 310 sends at least one normal status report to the SRNC 305.

Still referring to FIGS. 3 and 5, if the receiver 325 in the WTRU 310 receives an RLC intelligence mode indicator signal 365 that indicates that an intelligent RLC mode is in effect (step 540), the dual RLC intelligence mode processor 315 analyzes the entire sequence of PDUs received from the SRNC 305 to determine all missing PDUs and successfully received PDUs (step 545). In step 550, the transmitter 320 in the WTRU 310 sends a serving cell change status report to the SRNC 305 that indicates all of the missing PDUs and successfully received PDUs. In step 555, the transmitter 345 in the SRNC retransmits all of the missing PDUs to the WTRU 310 via the antenna 340. Due to this intelligent operation, the transmission of a normal status report is not necessary to recover missing data in this case.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:
   receiving a radio link control (RLC) intelligence mode indicator from a serving radio network controller (SRNC);
   in response to receiving a message indicating a high speed-downlink shared channel (HS-DSCH) serving cell change, transmitting a serving cell change status report including a first sequence indicator associated with a first received packet data unit (PDU);
   receiving a second PDU associated with a second sequence indicator wherein the second sequence indicator is greater than the first sequence indicator; and
   on a condition that the RLC intelligence mode indicator indicates a non-intelligent mode:
      the transmitting the serving cell change status report includes advancing a status prohibit timer to a penultimate position on a condition that a status prohibit timer is active, and
      the receiving the second PDU includes transmitting a status report including a negative acknowledgement, wherein the negative acknowledgement indicates a third PDU.

2. The method of claim 1, wherein on a condition that the RLC mode intelligence indicator indicates a non-intelligent mode and on a condition that the status prohibit timer is not active, the transmitting the serving cell change status report includes suppressing an activation of the status prohibit timer.

3. A wireless transmit/receive unit (WTRU) comprising:
   a transmitter;
   a receiver configured to receive a radio link control (RLC) intelligence mode indicator from a serving radio network controller (SRNC); and
   a processor configured to:
      control the transmitter to transmit a serving cell change status report including a first sequence indicator associated with a first received packet data unit (PDU) in response to the receiver receiving a message indicating a high speed-downlink shared channel (HS-DSCH) serving cell change,
      control the receiver to receive a second PDU associated with a second sequence indicator wherein the second sequence indicator is greater than the first sequence indicator, and
      on a condition that the RLC intelligence mode indicator indicates a non-intelligent mode:
         in response to transmitting the serving cell change status report, advance a status prohibit timer to a penultimate position on a condition that a status prohibit timer is active, and
         in response to the receiver receiving the second PDU, control the transmitter to transmit a status report including a negative acknowledgement, wherein the negative acknowledgement indicates a third PDU.

4. The WTRU of claim 3, wherein the processor is configured to suppress an activation of the status prohibit timer in response to transmitting the serving cell change status report, on a condition that the RLC mode intelligence indicator indicates a non-intelligent mode and on a condition that the status prohibit timer is not active.

* * * * *